INVENTORS·
ROME R. RUDOLPH
CARL J STRUTZ, JR. and
BY   FRANK C. STRUTZ

ATTORNEY

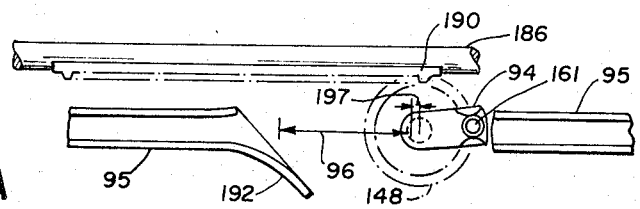
Fig.10A
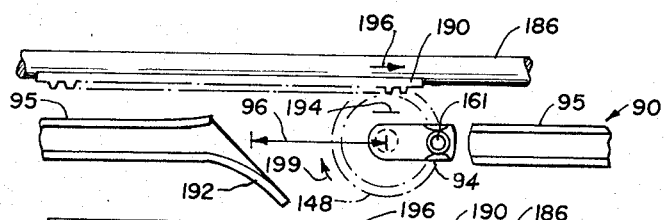
Fig.10B
Fig.10C
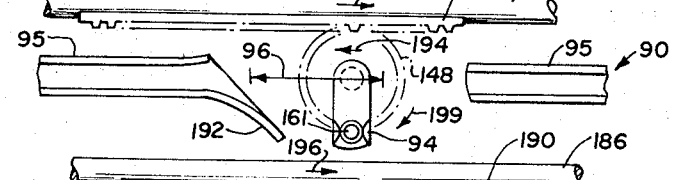
Fig.10D
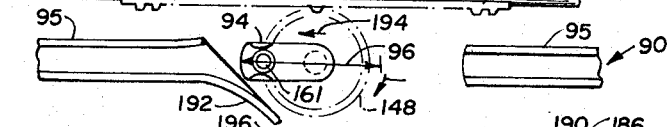
Fig.10E
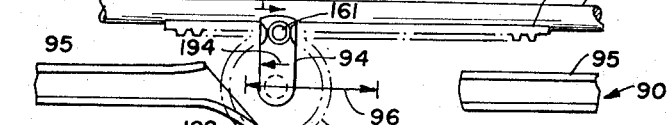
Fig.10F
Fig.10G
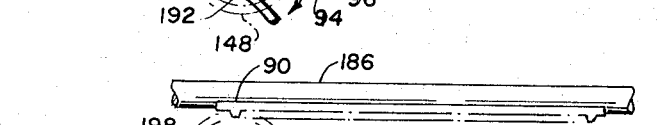

United States Patent Office 3,362,520
Patented Jan. 9, 1968

3,362,520
METHOD AND APPARATUS FOR REGISTERING WORKPIECES TO BE DECORATED
Rome R. Rudolph, Gibsonia, and Carl J. Strutz, Jr., and Frank C. Strutz, Mars, Pa., assignors to Carl Strutz & Co., Inc., Valencia, Pa., a corporation of Pennsylvania
Original application June 4, 1965, Ser. No. 461,373, now Patent No. 3,251,298, dated May 17, 1966. Divided and this application May 17, 1966, Ser. No. 550,847
3 Claims. (Cl. 198—33)

ABSTRACT OF THE DISCLOSURE

Apparatus for decorating workpieces provided with a registration index and wherein workpieces are conveyed in a continuous manner past a registration station and at least one decorating station. An indexing member is engaged with a rotating workpiece and moved in unison therewith to orient that workpiece surface to be decorated, exactly with a decorating screen at the decorating station. The index engaging member is then disengaged from the workpiece just registered and returned to an initial position preparatory to registering another workpiece.

---

This invention relates to a method and apparatus for registering workpieces, and more particularly to a method and apparatus for registering workpieces exactly with respect to a stencil screen bearing a design to be transferred to the workpieces while the workpieces are conveyed in a continuous manner through the decorating machine.

This application is a division of our copending application Ser. No. 461,373, filed June 4, 1965, and entitled, "Method and Apparatus for Decorating Generally Cylindrical Workpieces," and now U.S. Patent No. 3,224,757.

In recent years, most improvements in the bottle decorating art have been directed to apparatus employed in transferring the decorative imprints and in methods of decorating. For example, in our copending application Ser. No. 461,373, filed June 4, 1965, there is disclosed and claimed a method and apparatus for decorating generally cylindrical workpieces wherein the decorating station incorporates a pair of decorating screens and a pair of squeegees arranged to decorate the shoulder and body portions of the workpieces simultaneously. The overall arrangement is such that the stencil screens, the squeegees and the bottles are moved simultaneously for decorating the workpieces.

With respect to the registration station of decorating machines, many ingenious mechanisms have been devised for registering the workpieces. However, these mechanisms are relatively complex and costly to manufacture. For example, in one prior art decorating machine, each workpiece support cradle is provided with a registration finger positioned to be activated by a mechanism, such as a cam, disposed along the path of travel of the cradles and thereby moved into engagement with the workpieces while the workpieces are being rotated. The plurality of registration fingers adds considerably to the time involved in manufacturing the decorating machine and its overall cost.

Other registration devices employ a single registration finger. However, these devices are limited to use with intermittent motion type decorating machines, that is, machines wherein the workpieces are conveyed in a stop-start fashion.

Accordingly, as an overall object, the present invention seeks to provide apparatus for registering workpieces exactly with a stencil screen bearing a design to be transferred to the workpieces.

Another object of the invention is to provide apparatus for registering workpieces on the fly, that is, while the workpieces are conveyed at a constant velocity through the decorating machine.

Another object of the present invention is to provide apparatus for registering workpieces which is capable of registering workpieces at a rate heretofore unattainable.

Yet another object of the present invention is to provide aparatus for registering workpieces, which apparatus employs a single registration finger for registering workpieces on the fly.

Still another object of the present invention is to provide a novel method for registering workpieces for decoration.

The present invention is particularly adapted for use on decorating apparatus of the type wherein workpieces are conveyed continuously along a path of travel which extends past a registration station and at least one decorating station which is spaced from the registration station and which includes at least one decorating screen bearing a design to be transferred to the workpieces. The workpieces are each provided with a registration index in the form of either a projection or a depression which is cast into the workpieces during their manufacture.

In accordance with the present invention, at least one index engaging member or registration finger is provided at the registration station and is supported for movement in the direction of travel of the workpieces. Means is provided for engaging the index engaging member with that surface of the workpieces which contains the registration index, such that as the workpieces are rotated, the registration index will be brought into contact with the index engaging member to prevent further rotation of the workpieces, whereby the workpieces are registered exactly with respect to the decorating screen positioned at the decorating station. While the index engaging member is engaged with the workpiece, it is also moved in unison with the workpiece at least for a distance sufficient to permit contact between the registration index and the index engaging member. Thereafter, the index engaging member is disengaged from the workpiece just registered. The overall arrangement is such that the workpieces are registered exactly with the decorating screen while being conveyed at a constant velocity through the decorating machine.

The above and other objects and advantages of the present invention will become apparent from the following detailed description by reference to the accompanying drawings, in which:

FIGS. 10A–10G are views which illustrate the operation of a bottle rotating mechanism employed with the present registration apparatus.

Decorating machine—General description

Figure 1:
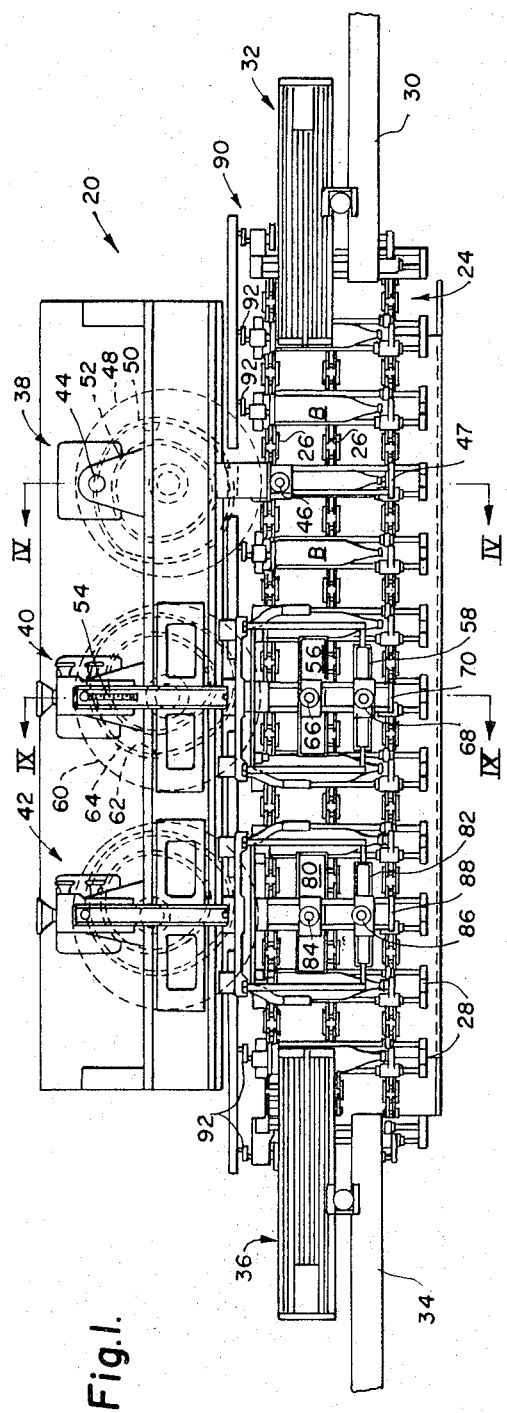
FIGURE 1 is an overall plan view of a decorating machine provided with the registration apparatus of the present invention.
Figure 2:
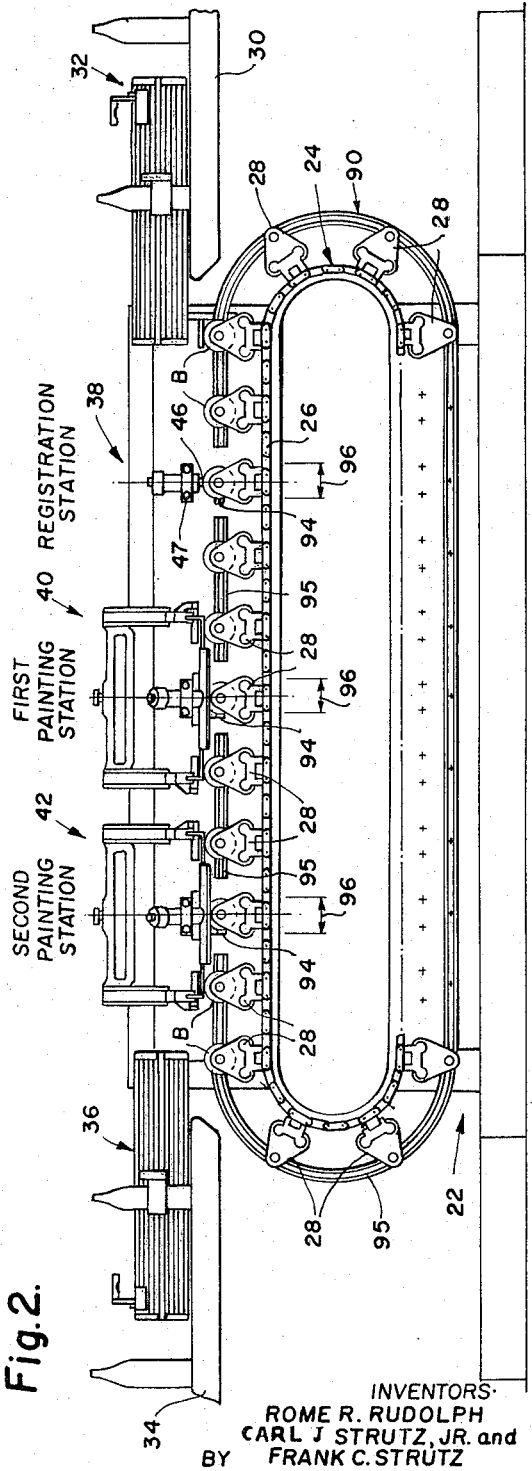
FIG. 2 is an overall front view of the decorating machine of FIG. 1.

Reference is now directed to FIGS. 1 and 2 wherein the overall arrangement of decorating machine 20 of the invention is illustrated. The decorating machine 20 comprises a base 22 supporting an endless conveyor 24 which conveys generally cylindrical workpieces, such as the bottles B, through the decorating machine 20. The endless conveyor 24 comprises a set of endless chains 26 having a plurality of workpiece supporting mechanisms 26 secured thereto at uniformly spaced points along its length. At the right end of the decorating machine 20 there is provided a feed conveyor 30 which conveys workpieces to a loading mechanism 32. At the left end of the decorating machine 20 there is provided a discharge conveyor 34 which receives decorated workpieces from an unloading mechanism 36.

The loading and unloading mechanisms 32, 36 are schematically illustrated herein. Although not limited thereto, the loading and unloading mechanisms 32, 36 preferably comprise that mechanism described and illustrated in copending application Ser. No. 382,005, filed July 31, 1964.

The decorating apparatus 20 has, as illustrated in FIGS. 1 and 2, a registration station 38 positioned adjacent to the loading apparatus 32; a first painting station 40 disposed downstream of the registration station 38; and a second painting station 42 disposed adjacent to the unloading apparatus 36.

The registration station 38 includes a first oscillating vertical drive shaft 44 which serves to reciprocate a registration finger 46 carried on a cantilever arm 47, parallel to the movement of the bottles B as the bottles B are conveyed through the decorating apparatus 20 by means of the conveyor 24. At the registration station 38, the bottles B are rotated about their longitudinal axes and stopped by means of the registration finger 46 in a predetermined orientation with respect to the decorating screens of the painting stations 40, 42. The first oscillating vertical drive shaft 44 is oscillated by a cam disc 48 having a cam track 50 provided thereon. The first vertical drive shaft 44 has rotatably secured thereto a cam roller 52 which resides within and is guided by the cam track 50. The cam disc 48 is rotated at a constant angular velocity in a counterclockwise direction so that the registration finger 46 moves with one of the bottles B (to the left of FIG. 1) during registration and thereafter returns to its initial position preparatory to the registering of the next successive one of the bottles B.

The first painting station 40 includes a second oscillating vertical drive shaft 54 which, as will be more fully described, serves to reciprocate a rack associated with a mechanism for rotating the bottles B during registration and to reciprocate a body screen 56 and a shoulder screen 58 parallel to the movement of the bottles B. The body screen 56 cooperates with a squeegee 66 to decorate the body portion of the bottles B while the shoulder screen 58 cooperates with a squeegee 68 to decorate the shoulder or neck portion of the bottles B. The squeegees 66, 68 are carried on a cantilever arm 70. The second oscillating vertical drive shaft 54 is oscillated by a cam disc 60 having a cam track 62 formed thereon. The second oscillating vertical drive shaft 54 has rotatably secured thereto a cam roller 64 which resides within and is guided by the cam track 50. In the first painting station 40, the cam disc 60 is rotated at the same constant angular velocity as the cam disc 48 and in the same direction.

The second painting station includes a body screen 80 and a shoulder screen 82 which cooperate with squeegees 84, 86 to decorate the body and neck or shoulder portions of the bottles B. The squeegees 84, 86 are supported on a cantilever arm 88.

Figure 7:
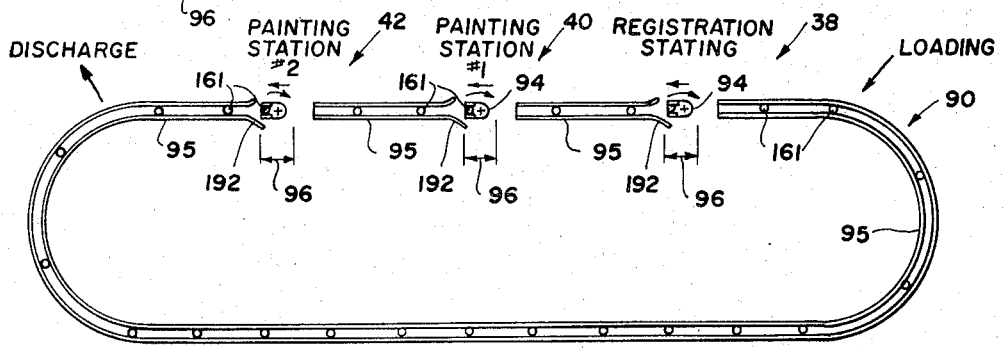
FIG. 7 is a side view schematically illustrating a segmented track employed with the present registration apparatus.

The decorating machine 20 is provided with a segmented track 90 best shown in FIGS. 2 and 7, which comprises three movable track segments 94 and a plurality of stationary track segments 95. The movable track segments 94 are positioned one at the registration station 38 and one at each of the decorating stations 40, 42. The stationary track segments 95 guide lever arms 92 (FIG. 1) into engagement with the movable track segments 94. The movable track segments 94 are employed to rotate each bottle during registration and decoration at each of the decorating stations 40, 42. Hence, in the decorating apparatus 20, the bottles B are rotated about their longitudinal axes once during registration and once during each decorating operation. At all other times, the bottles B remain stationary with respect to the workpiece supporting mechanism 28 by virtue of the fact that the lever arms 92 are engaged with the stationary portions of the segmented track 90.

In FIG. 2, a distance or length of bottle movement is illustrated by the dimension line 96. This distance 96 is the same for the registration station 38 and for both of the decorating stations 40, 42. It is to be noted that the decorating apparatus 20, registration and decorations are completed within the time interval required for the bottles B to move through the distance 96. Furthermore, the bottles B are rotated through 360° during their movement through the distance 96.

Each of the movable track segments 94 is rotatably supported on a bottle rotating mechanism, not visible herein, which reciprocates through a distance which is slightly greater than the distance 96 as will be described later in the specification. The bottle rotating mechanism serves to rotate each of the bottles B in a clockwise direction (as viewed in FIG. 2) during registration at the registration station 38 and during decoration at the first and second painting stations 40, 42. As will become apparent, the bottle rotating mechanism comprises a first portion which is movable with the bottles during rotation of the same and a rack member or second portion which is movable in the opposite direction and which serves to rotate the bottles B through 360° in the time interval required for the bottle to travel through the distance 96. The first portion of the bottle rotating mechanism and the registration finger 46 is moved in unison and is driven by means of the first oscillating vertical shaft 44. The rack associated with the bottle rotating mechanism is reciprocated by means of the second vertical oscillating shaft 54. In the decorating apparatus 20, the cam tracks 50 and 62 have identical configurations. It is preferred, however, that the cam track 50 is a mirror image of the cam track 62 so that the cam discs 48 and 60 are rotated in a clockwise direction.

First oscillating vertical drive shaft 44

Figure 3:
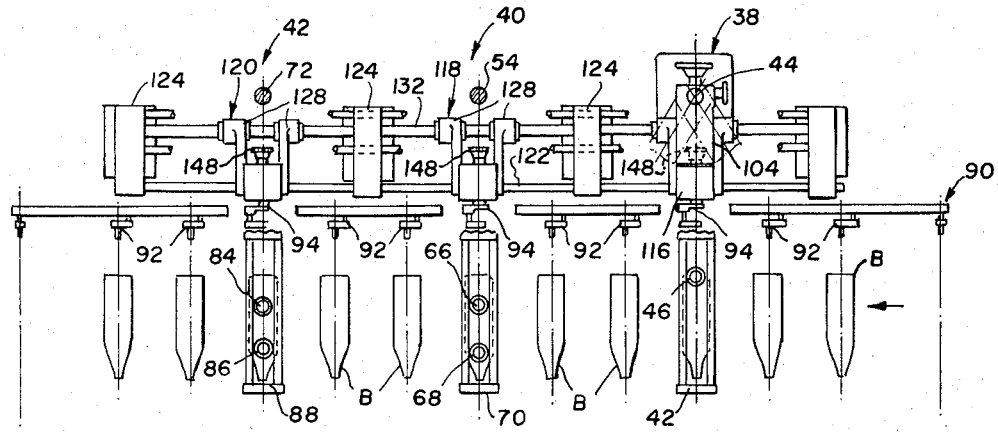
FIG. 3 is a fragmentary plan view, with parts omitted, illustrating the registration apparatus of the present invention.
Figure 4:
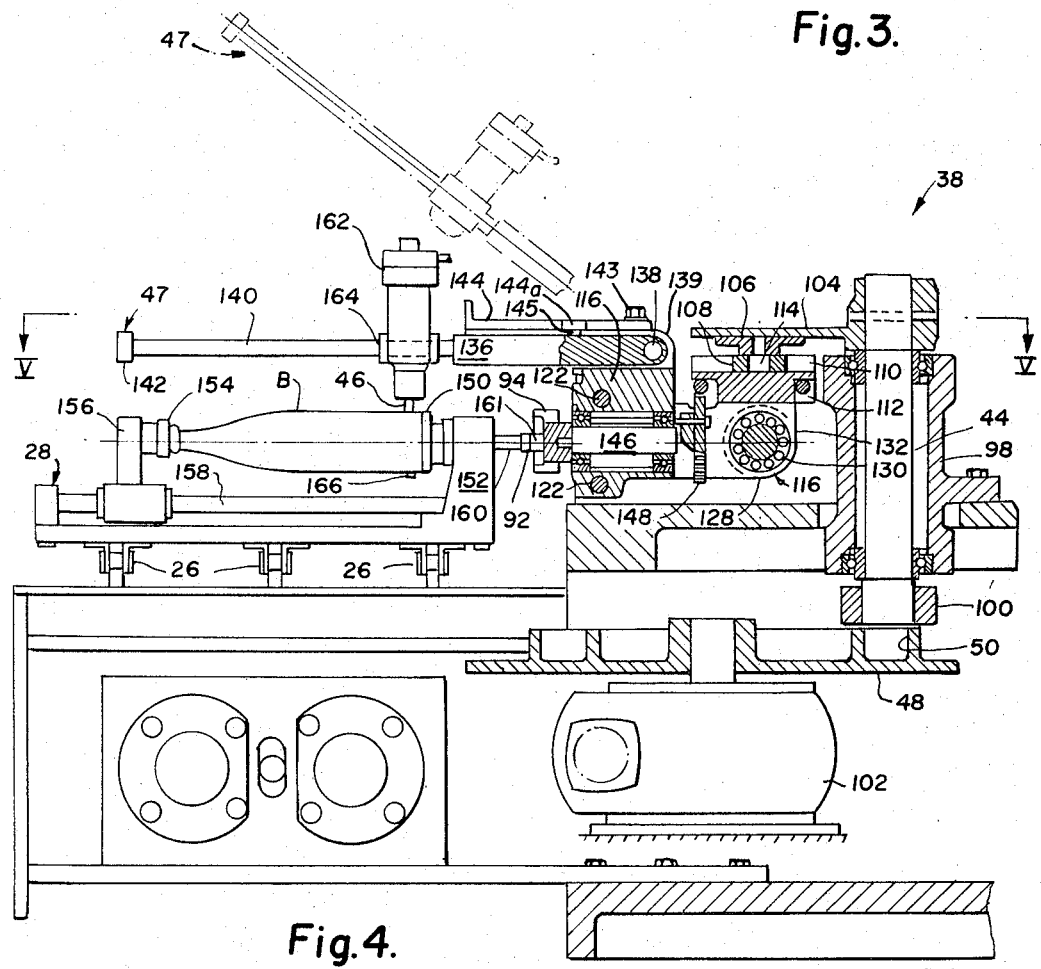
FIG. 4 is a cross-sectional view taken along the line IV—IV of FIG. 1, further illustrating the present registration apparatus.

Referring now to FIGS. 3 and 4, the first oscillating vertical drive shaft 44 is employed to reciprocate the registration finger 46, the cantilever arm 47, and the first portion of the bottle rotating apparatus now to be described.

As can best be seen in FIG. 4, the first oscillating vertical drive shaft 44 is journaled to a housing 98 and is supported in a vertical position. Secured to the lower end of the drive shaft 44 is a rock arm 100 to which is rotatably secured the cam roller 52 (FIG. 1). The cam roller 52 resides within and is guided by the cam track 50 of the cam disc 48. Drive means 102 is employed to rotate the cam disc 48 in a counterclockwise direction and at a constant angular velocity.

Secured to the upper end of the drive shaft 44 is an oscillating arm 104 having a socket member 106 secured to its lower face. The center of the socket member 106 is disposed at a predetermined radial distance from the center line of the drive shaft 44. The radial distance is such that as the oscillating arm 104 oscillates in the manner shown in FIG. 3, a chord connecting the extreme positions of the socket member will have a length equal to a distance, to be described, which is slightly greater than the distance 96 shown in FIG. 2. Directly beneath the socket member 106 is a connector block 108 which is slidable in a guideway 110 formed in a support block 112. A connecting pin 114 extends between and is rotatable in the socket member 106 and the connector block 108. As the oscillating arm 104 oscillates, the connector block 108 will move longitudinally through the guideway 110 while causing the support block 112 to undergo reciprocal motion in a direction normal to the plane of the drawing, i.e., parallel to the travel of the bottles.

As can best be seen in FIG. 3, three carriage members 116, 118 and 120 are provided one for the registration station 38 and one each for the first and second painting stations 40, 42. The carriage members 116–120 are connected by a pair of shafts 122 which is aligned in a vertical plane and are secured to each of the carriage members 116–120. At uniformly spaced points along the shafts 122 there is provided bearing blocks 124. The shafts 122 extend through journals such as ball bushings 126 (FIG. 5) which permit free sliding movement of the shafts 122 reciprocally through the bearing blocks 124. Each of the carriages 116–120 is provided with spaced cylindrical hubs 128 having journals such as ball bushings 130 (FIGS. 4 and 6) retained therein. Extending through all of the ball bushings 130 and the bearing blocks 124 is a fixed large diameter shaft 132 which is secured to each of the bearing blocks 124, for example, by means of set screws 134.

It shouldd be evident that as the first oscillating vertical drive shaft 44 oscillates back and forth, all of the carriage members 116–120 are reciprocated back and fourth parallel to the path of travel of the bottles B and through a distance, to be described, which is slightly greater than the distance 96. The carriage members 116–120 support the cantilever arms 47, 70 and 88, and hence, the cantilever arms 47, 70 and 88 reciprocate with the carriage members 116–120.

Figure 5:
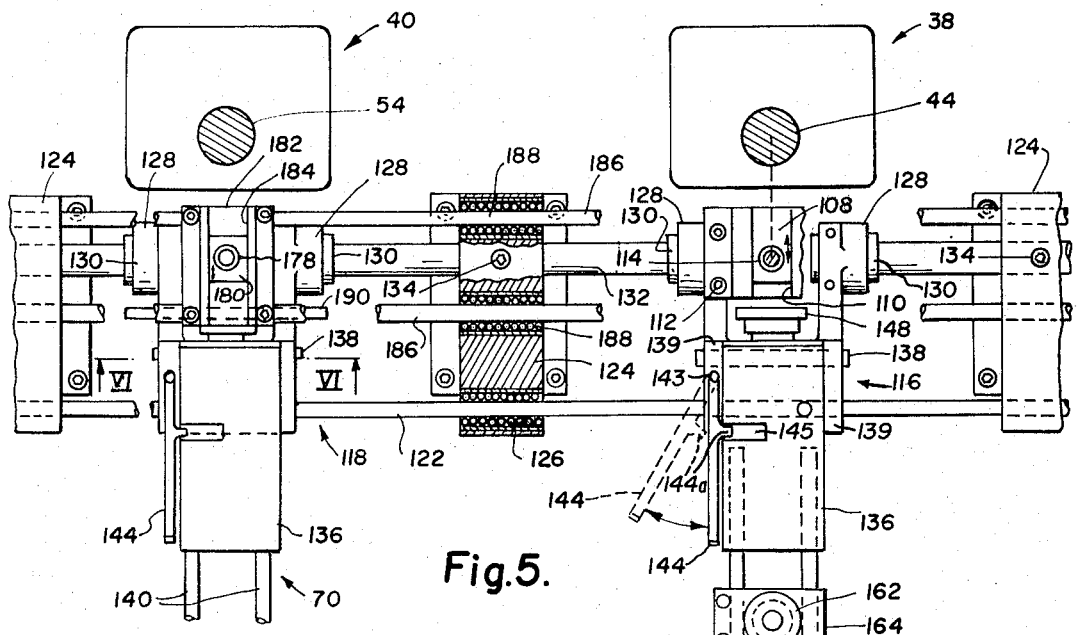
FIG. 5 is a cross-sectional view taken along the line V—V of FIG. 4.
Figure 6:
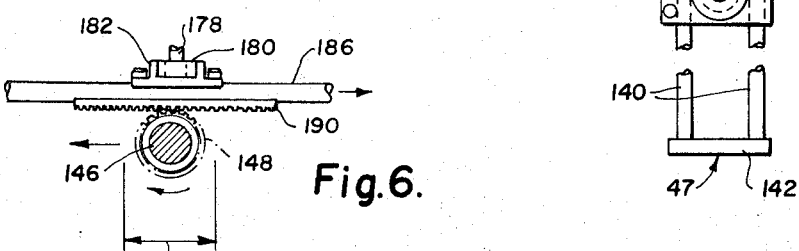
FIG. 6 is a cross-sectional view taken along the line VI—VI of FIG. 5.

As can best be seen in FIGS. 4 and 5, the cantilever arm 47 is shown comprising a plate member 136 having one of its ends pivotally supported on a pin 138 extending through ears 139 of the carriage member 116 and having a pair of spaced rods 140 projecting outwardly from its other end. A tie member 142 extends between and connects the ends of the rods 140. The carriage member 116 is provided with a locking arm 144 which is pivotal about a bolt 143 threaded into the ear 139, from a locking position shown in full lines in FIG. 5 to a releasing position shown in dotted outline in FIG. 5. The locking arm 144 is provided with a lug 144a which overlies and engages a projection 145 carried by the plate member 136, to lock and prevent the cantilever arm 47 from being raised. When the locking arm 144 is pivoted to its releasing position, the cantilever arm 47 may be pivoted upwardly about the pin 138 into the raised position shown in dash-dot outline in FIG. 4.

Referring now to FIG. 4 the carriage member 116 has a shaft 146 extending therethrough and journaled therein for rotation about an axis which is coincident with the longitudinal axis of the bottle B. The movable track segment 94 is secured to the conveyor side of the shaft 146 while a drive pinion 148 is secured to the opposite end of the drive shaft 146. As will be described, the drive pinion 148 cooperates with a rack in rotating the bottle B through 360° while the bottle B traverses the distance 96 (FIG. 2).

The workpiece supporting mechanism 28 comprises a base chuck 150 rotatably supported on a stationary vertical standard 152, and a neck chuck 154 rotatably supported on a movable vertical standard 156. The movable vertical standard 156 is positionable along the length of a pair of support shafts 158 (only one visible) so that the distance between the base chuck 150 and the neck chuck 154 may be adjusted. Therefore, the workpiece supporting mechanism 28 is capable of supporting bottles of various lengths. Although not specifically illustrated, the movable vertical standard 156 is releasably secured to one of the shafts 158, which shaft is supported for reciprocal movement along its longitudinal axis. Therefore, at the feed end of the decorating machine 20, the neck chuck 154 is displaced away from the base chuck 150 to accept a bottle from the loading mechanism 32 and thereafter moved toward the base chuck 150 to clamp the bottle therebetween. The bottles are then carried through the decorating machine 20 to the discharge end of the decorating machine 20 whereupon the neck chuck 154 is again displaced away from the base chuck 150 to release the decorated bottle for conveyance by the unloading apparatus 32 (FIG. 1) to the discharge conveyor 34. Although not limited thereto, the workpiece supporting mechanism preferably comprises that workpiece supporting mechanism described and illustrated in copending application Ser. No. 414,079, filed Nov. 27, 1964. For a complete description of the construction and operation of the workpiece supporting mechanisms 28, reference is directed to the aforesaid copending application Ser. No. 414,079.

Figure 8:
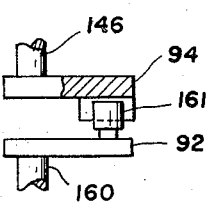
FIG. 8 is a view schematically illustrating a connection between a lever arm and a movable track segment of the segmented track of FIG. 7.

As can best be seen in FIG. 4, the base chuck 150 is connected to a shaft 160 which, in turn, projects beyond the stationary vertical standard 152. The lever arm 92 is secured to the end of the shaft 160. As shown in FIGS. 4 and 8, a roller 161 is rotatably secured to the free end of the lever arm 92 and is engaged in the movable track segment 94. When the movable track segment 94 is rotated, the bottle B is rotated through 360° during its travel through the distance 96 (FIG. 2).

FIG. 4 is a cross section taken through the registration station 38. As can be seen, the registration finger 46 is moved into and out of engagement with the bottle B preferably by means of a pneumatically operated cylinder 162. A complete description of the construction and operation of the cylinder 162 will be found in U.S. Patent No. 3,172,357, issued March 9, 1965. Alternatively, any other suitable mechanism may be used to support and operate the registration finger 46. A support block 164 connects the pneumatically operated cylinder 162 to the cantilever arm 47 in a manner whereby the registration finger 46 may be elevated or lowered to place it at the desired distance from the bottle B.

In FIG. 4, the registration finger 46 is shown engaged with the base of the bottle B. To aid in registering the area of the bottle B to be decorated, with the decorating screens at the first and second decorating stations 40, 42, it is normal practice to provide a registration index such as a small projection or lug 166 on the bottle which is formed or cast therein at a suitable location, for example, near the base of the bottle B. Alternatively, the registration index could comprise a depression. The projection or lug 166 facilitates precise locating of the bottle for registration of single or successive decorative imprints. That is to say, the bottle B will be rotated in a clockwise direction until the lug 166 engages the registration finger 46. At that time, the bottle B will be stopped while the base chuck 150 continues to rotate while sliding over the bottom of the bottle B. When the base chuck 150 has completed its 360° rotation, the bottle areas to be decorated will be in exact registry with the designs on the screens 56, 58, 80 and 82. Thereafter, the registration finger 46 is lifted whereupon the pneumatically operated cylinder 162 is moved back to the starting point preparatory to the registration of the next successive one of the bottles B.

*Second oscillating vertical drive shaft 54*

As stated above, the second oscillating vertical drive shaft 54 serves to drive the body and shoulder screens 56, 58 of the first painting station 40 and the above-mentioned racks forming part of the bottle rotating mechanisms.

Figure 9:
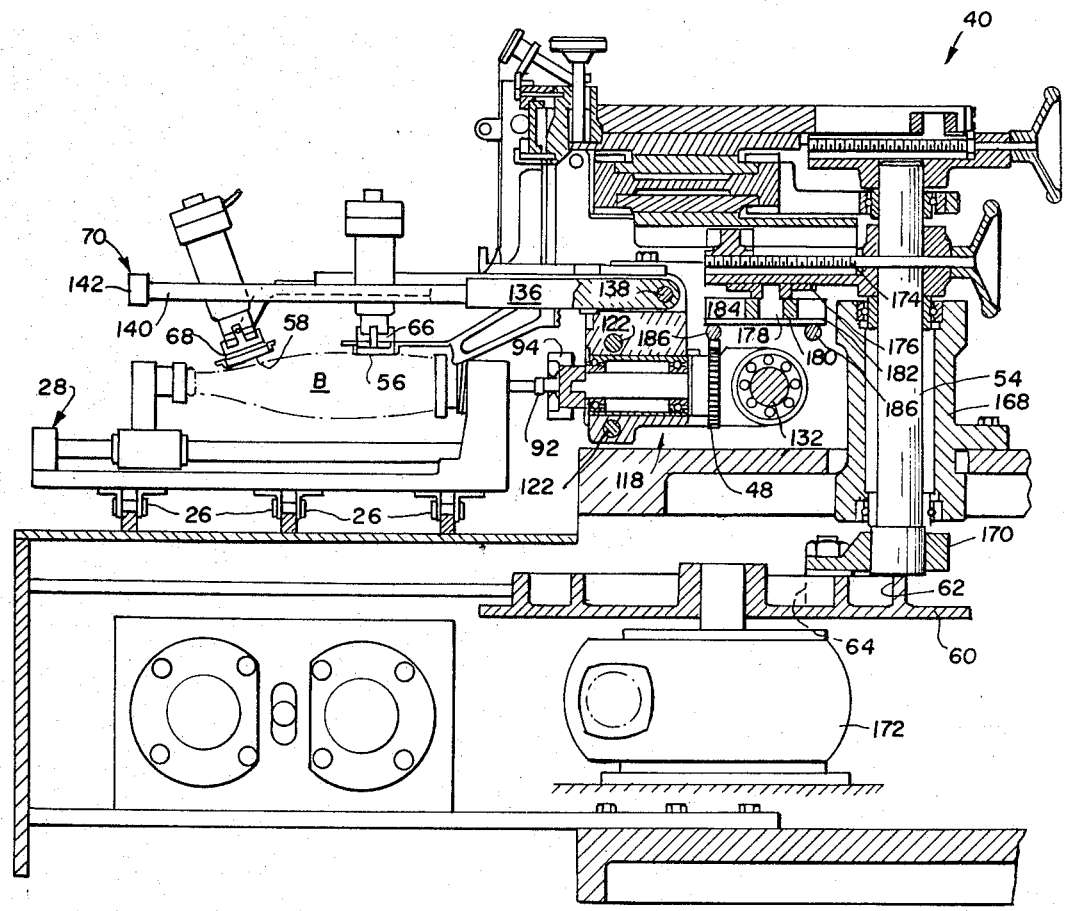
FIG. 9 is a cross-sectional view taken along the line IX—IX of FIG. 1.

In FIGS. 8 and 9, the second oscillating vertical drive shaft 54 is shown journaled in a housing 168 for oscillation about a vertical axis. At the lower end of the second drive shaft 54 there is secured a rock arm 170 to which is rotatably secured the cam roller 64. The cam roller 64 is disposed within and is guided by the cam track 62 of the cam disc 60. Drive means 172 is employed to rotate the cam disc 60 in a clockwise direction and at a constant angular velocity. As the cam disc 60 rotates, the cam roller 64 will follow the path of the cam track 62 thereby causing the second drive shaft 54 to oscillate through an angle of 60°.

An oscillating arm 174 is secured to the second drive shaft 54 and projects radially therefrom. A socket member 176 is secured to the lower face of the oscillating arm 174 and has rotatably disposed therein a connecting pin 178. The connecting pin 178 extends into and is rotatable in a support block 180 which, in turn, is slideable in a guideway 184 formed in a support member 182. The center of the socket member is displaced radially from the central axis of the second drive shaft 54 by a distance such that when the socket member oscillates through 60°, a chord connecting the extreme positions of the socket member will have a length equal to a distance, to be decsribed, which is slightly greater than the distance 96 (FIG. 2). Therefore, as the oscillating shaft 174 oscillates through 60°, the support block 180 will move reciprocally and parallel to the path of travel of the bottles B through a distance slightly greater than the distance 96 (FIG. 2).

*Bottle rotating mechanism*

As stated above, the pinion 148 is rotated by means of a rack whereby the bottles are rotated through 360° during their travel through the distance 96. To complete the description of the bottle rotating mechanism components, reference is now directed to FIGS. 5, 6 and 9.

The support block or drive member 182 is secured to a pair of rods 186 which are aligned in a horizontal plane and extend through all of the support blocks 124. As can be seen in FIG. 5, each of the support blocks 124 is provided with a journal such as ball bushings 188 which support the rods 186 for free longitudinal sliding movement. Three racks 190 are secured at spaced points along one of the rods 186. Specifically, one of the racks is positioned in meshing relation with each of the drive pinions 148 associated with each of the carriage members 116– 120. The length of each of the racks 190 is preferably greater than the circumference of the pinion 148. The rack 190 will be moved through a distance, to be described which is slightly greater than the distance 96 and in a direction opposite to the travel of the pinion 148. When the rack 190 is moved in a direction to the right of FIG. 6 through the distance 96, for example, and the pinion 148 is moved in a direction to the left of FIG. 6 through the same distance 96, the pinion 148 will be rotated through exactly 360°. It should be evident then that at the registration station, and both of the decorating stations 40, 42, each bottle being registered and decorated will be moved through the distance 96 while simultaneously being rotated through exactly 360°. The operation of the bottle rotating mechanism will be fully described later in the specification with reference to FIGS. 10A–10G.

*Segmented track 90*

Reference is now directed to FIG. 7 wherein the segmented track 90 is schematically illustrated. As can be seen, the rollers 161 associated with the lever arms 92 are guided by the stationary track segments 95 into engagement with the movable track segments 94. A fish mouth 192 is provided at the entrance end of each of the stationary track segments 95 to guide the rollers 161 into the stationary track segments 95. Therefore, when a bottle is deposited on a workpiece support mechanism at the loading point of the decorating apparatus 20, the bottle will remain stationary with respect to the support mechanism from the loading point to the registration station, from the registration station to the first painting station, from the first painting station to the second painting station and from the second painting station to the discharge point. However, during its travel through the registration station 38 and each of the decorating stations 40 and 42, the bottle will be rotated through exactly 360° while moving through the distance indicated at 96.

It should be evident from FIG. 7, that once the bottle has been registered at the registration station 38, the bottle is rotated only twice during its travel through the decorating apparatus 20. That is, the bottle is rotated once at the first painting station and a second time at the second painting station. It should be obvious then that the slight loss in registration associated with misaligned neck and bottom chucks is considerably minimized by the present mode of operation.

*Operation of bottle rotating mechanism*

Reference is now directed to FIGS. 10A–10G wherein the progress of the movable track segment 94 is illustrated during its simultaneous linear travel and clockwise rotation.

In FIG. 10A, the roller 161 associated with the bottle being decorated, is shown engaged with the movable track segment 94 prior to the start of a decorating operation. The drive pinion 148 is engaged with one end of the rack 190. The rack 190 is shown displaced to the left of FIG. 10A. During the decorating operation, the movable track segment 94 and the drive pinion 148 are moved at a constant linear velocity by the oscillating arm 104 (FIG. 4) while the rack 190 is moved at the same constant linear velocity by the oscillating arm 174 (FIG. 9). as described above. The direction of linear movement of the movable track segment 94 and the drive pinion 148 during a decorating operation is indicated in FIGS. 10B– 10F by the arrow 194 while the movement of the rack 190 is indicated by the arrow 196.

In FIG. 10A, the center of the drive pinion 148 is displaced to the right of the starting point of the distance 96 by a small distance indicated at 197. In FIG. 10G, the center of the drive pinion 148 is displaced to the left of the terminating point of the distance 96 by a small distance indicated at 198. Earlier in the specification reference was repeatedly made to "a distance which is slightly greater than the distance 96." This larger distance is equal to the sum of the distances 96, 197 and 198.

In FIG. 10A, the movable track segment 94 is illustrated at a position corresponding the end of its return travel, i.e., to the right of FIG. 10A and will begin to rotate in a clockwise direction as indicated by the arrow 199 and move to the left when the drive pinion 148 is moved to the left. During movement of the movable track segment 94 between the positions illustrated in FIGS. 10A and 10B, i.e., through the small distance 197, it is quickly accelerated to the constant linear velocity at which the roller 161 is traveling. Thereafter and until the movable track segment traverses the distance 96, it will move at that constant linear velocity. When, however, the movable track segment reaches that position illustrated in FIG. 10G, it will be quickly decelerated to a complete stop in the time interval required for it to move to the position illustrated in FIG. 10F, i.e., through the small distance 198. Thereafter, the above-described cycle will be repeated but in the reverse order so that the movable track segment 94 will be returned to its initial position as illustrated in FIG. 10A, preparatory to its rotating the next successive bottle.

It will become apparent by comparing FIGS. 10B–10F, that since the rack 190 and the drive pinion 148 are moved in opposite directions at substantially equivalent velocities, the drive pinion 148, and hence, the bottles B, will be rotated at a constant angular velocity. Furthermore, since the length of the rack 190 is greater than the circumference of the drive pinion 148, the drive pinion 148 and, hence, the bottles, will be rotated through 360°.

Although the invention has been shown in connection with one specific embodiment, it will be readily apparent to those skilled in the art that various changes in form and arrangement of parts may be made to suit requirements without departing from the spirit and scope of the invention.

We claim as our invention:

1. In apparatus for decorating workpieces provided with a registration index, and including conveyor means for conveying said workpieces in succession along a path of travel extending past at least one decorating station along a stencil screen for applying a decorative imprint to an area of each workpiece, the improvement in means for orienting said area of each workpiece with said stencil screen, comprising:

at least one index engaging member positioned in advance of said decorating station;

support means extrinsic of said conveyor means for supporting said index engaging member for movement parallel with said path of travel;

means for engaging said index engaging member with that surface of each workpiece containing said registration index;

means for rotating each workpiece during orientation;

means for moving said index engaging member in unison with each workpiece and while engaged therewith at least for a distance along said path of travel sufficient to permit said registration index to contact said index engaging member and prevent rotation of the workpiece, whereby said area is oriented exactly with said stencil screen; and means for disengaging said index engaging member from the workpiece just oriented.

2. In apparatus for decorating workpieces provided with a registration index, and including conveyor means for conveying said workpieces in succession along a path of travel extending past at least one decorating station along a stencil screen for applying a decorative imprint to an area of each workpiece, the improvement in means for orienting said area of each workpiece with said stencil screen, comprising:

at least one index engaging member positioned in advance of said decorating station;

means supporting said index engaging member for reciprocal movement parallel with said path of travel;

means for engaging said index engaging member with that surface of each workpiece containing said registration index;

means for rotating each workpiece during orientation;

means for moving said index engaging member in unison with each workpiece and while engaged therewith at least for a distance along said path of travel sufficient to permit said registration index to contact said index engaging member and prevent further rotation of the workpiece, whereby said area is oriented exactly with said stencil screen, said means for moving said workpiece comprising a reciprocating drive which returns said index engaging member to a starting point preparatory to orienting the next successive workpiece; and means for disengaging said index engaging member from the workpiece just oriented.

3. In the method of decorating workpieces provided with a registration index, wherein the workpieces are conveyed in succession along a path of travel extending past a registration station at which the workpieces are registered exactly with a stencil screen bearing a design to be transferred to the workpieces, and at least one decorating station which is spaced from said registration station and which includes at least one stencil screen bearing a design to be transferred to the workpiece; the steps of rotating each workpiece during its travel through said registration station;

displacing an index engaging member from an initial position at said registration station, into contact with that surface of each workpiece containing said registration index, while simultaneously moving said index engaging member in unison with the workpiece being registered at least for a distance along said path of travel sufficient to permit engagement of said registration index with said index engaging member to prevent further rotation of the workpiece at which time the workpiece is oriented exactly with said stencil screen;

thereafter disengaging said index engaging member from the workpiece just registered; and while still positioned in advance of said decorating station, reversing the direction of travel of said index engaging member to return the same to said initial position preparatory to orienting another workpiece.

References Cited

UNITED STATES PATENTS 2,157,638   5/1939   Soubier _____ 198—33 X

EDWARD A. SROKA, *Primary Examiner.*